United States Patent
Lee et al.

(10) Patent No.: US 9,772,692 B2
(45) Date of Patent: Sep. 26, 2017

(54) FLEXIBLE DISPLAY DEVICE

(71) Applicant: SAMSUNG DISPLAY CO., LTD., Yongin-si, Gyeonggi-do (KR)

(72) Inventors: Dong-Hoon Lee, Hwaseong-si (KR); Tae Jin Kim, Hwaseong-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/968,946

(22) Filed: Dec. 15, 2015

(65) Prior Publication Data

US 2016/0349858 A1    Dec. 1, 2016

(30) Foreign Application Priority Data

May 27, 2015  (KR) .................. 10-2015-0073739

(51) Int. Cl.
  *G06F 3/03* (2006.01)
  *G06F 1/16* (2006.01)

(52) U.S. Cl.
  CPC .............. *G06F 3/03* (2013.01); *G06F 1/1652* (2013.01)

(58) Field of Classification Search
  CPC ................. G06F 3/03; G06F 1/1652; G06F 2303/04102; G09G 2380/02
  USPC .................. 345/156, 173–178, 901
  See application file for complete search history.

(56) References Cited

U.S. PATENT DOCUMENTS

| | | | |
|---|---|---|---|
| 2003/0165178 A1* | 9/2003 | Borden ................... | G01N 25/72 374/5 |
| 2004/0032399 A1* | 2/2004 | Sekiguchi ........... | G06F 3/03545 345/173 |
| 2009/0181732 A1* | 7/2009 | Isoda ..................... | H01Q 1/243 455/575.3 |
| 2012/0038570 A1* | 2/2012 | Delaporte ............. | G06F 1/1616 345/173 |
| 2013/0300678 A1* | 11/2013 | Kang ..................... | G06F 3/044 345/173 |
| 2015/0029683 A1 | 1/2015 | Kim et al. | |
| 2015/0193000 A1* | 7/2015 | Hu .......................... | G06F 3/017 345/156 |
| 2015/0205560 A1* | 7/2015 | Zhao ..................... | G06F 1/1641 345/1.1 |

FOREIGN PATENT DOCUMENTS

| | | |
|---|---|---|
| KR | 10-2009-0087303 A | 8/2009 |
| KR | 10-2014-0000423 A | 1/2014 |
| KR | 10-2014-0008897 A | 1/2014 |

\* cited by examiner

*Primary Examiner* — Stephen Sherman
(74) *Attorney, Agent, or Firm* — Lee & Morse, P.C.

(57) ABSTRACT

A flexible display device includes a substrate, at least one sensing pattern, and a fold detector. The substrate is foldable along at least one folding line. The sensing pattern is in a peripheral area of the substrate. The fold detector is connected to the sensing pattern and detects whether the sensing pattern is disconnected.

19 Claims, 11 Drawing Sheets

FLEXIBLE DISPLAY DEVICE

CROSS-REFERENCE TO RELATED APPLICATION

Korean Patent Application No. 10-2015-0073739, filed on May 27, 2015, and entitled: "Flexible Display Device," is incorporated by reference herein in its entirety.

BACKGROUND

1. Field

One or more embodiments described herein relate to a flexible display device.

2. Description of the Related Art

A variety of flat panel displays have been developed. Examples include a liquid crystal display and an organic light emitting display.

A liquid crystal display generally includes an upper panel where a common electrode and a color filter are formed, a lower panel where a thin film transistor and a pixel electrode are formed, and a liquid crystal layer between the upper and lower panels. An electric field is generated in the liquid crystal layer when a potential difference exists between the pixel electrode and the common electrode. The electric field determines the alignment direction of liquid crystal molecules in the liquid crystal layer. The alignment direction, in turn, determines the transmittance of incident light for purposes of forming an image.

An organic light emitting display device includes a hole injection electrode (anode), an electron injection electrode (cathode), and an organic emission layer between the hole injection electrode and the electron injection electrode. This type of display is a self-emissive display. In operation, holes injected from the anode and electrons injected from the cathode recombine in the organic emission layer to emit light.

These display devices may be formed using glass substrates. A glass substrate is heavy and fragile and therefore limits portability. Also, this type of substrate is not ideal for large-screen.

Display devices have been developed which use plastic substrates, which are light, strong, and flexible. In particular, an organic light emitting display device has been developed as a flexible display device or a stretchable display device. These display devices use substrates made of flexible or stretchable material, such as plastic or foil. These substrates are suitable for fabricating thin, light displays with large area screens.

SUMMARY

In accordance with one or more embodiments, a foldable display device includes a display substrate which is foldable along at least one folding line; at least one sensing pattern in a peripheral area of the display substrate; and a fold detector connected to the at least one sensing pattern, the fold detector to detect whether the at least one sensing pattern is disconnected.

The at least one sensing pattern may cross the at least one folding line, the at least one sensing pattern may include a connection conductor connected to the fold detector and a contact conductor selectively connected to the connection conductor, the connection conductor may contact the contact conductor in a first state, and the connection conductor may be separated from the contact conductor in a second state, the first state may correspond to no stress is applied to the display substrate and the display substrate being substantially flat, and the second state may correspond to stress applied to the display substrate and the display substrate folded with reference to the at least one folding line.

The device may include a plurality of sensing patterns, wherein: a node of a connection conductor and a contact conductor of a first sensing pattern coincides with the at least one folding line, a node of a connection conductor and a contact conductor of a second sensing pattern is spaced by a first distance from the at least one folding line, and a node of a connection conductor and a contact conductor of a third sensing pattern is spaced by a second distance from the at least one folding line different from the second distance. The first distance may be less than the second distance.

The device may include a plurality of sensing patterns, wherein: a node of a connection conductor and a contact conductor of one of the sensing patterns is separated from the at least one folding line by a first distance, and a node of a connection conductor and a contact conductor of another one of the sensing patterns is spaced from the at least one folding line by a second distance.

The fold detector may include a first fold sensor spaced from a second fold sensor with reference to the at least one folding line, and the at least one sensing pattern includes: a first connection conductor connected to the first folding sensor, a second connection conductor connected to the second folding sensor, and a contact conductor between the first connection conductor and the second connection conductor and selectively contacting the first connection conductor and the second connection conductor.

The device may include a plurality of folding lines including a first folding line adjacent to the first folding sensor and a second folding line adjacent to the second folding sensor, wherein: the first connection conductor, the second connection conductor, and the contact conductor contact each other in a first state, the first connection conductor is spaced from the contact conductor in a second state; the second connection conductor is spaced from the contact conductor a third state, wherein no stress is applied to the display substrate and the display substrate is substantially flat in the first state, stress is applied to the display substrate and the display substrate is folded with reference to the first folding line in the second state, and stress is applied to the display substrate and the display substrate is folded with reference to the second folding line in the third state.

The device may include a plurality of folding lines including a first folding line, a second folding line, and a third folding line that are substantially parallel with each other, a plurality of sensing patterns including a first sensing pattern, a second sensing pattern, and a third sensing pattern respectively crossing the first folding line, the second folding line, and the third folding line, and the fold detector includes a first folding sensor, a second folding sensor, and a third folding sensor respectively connected to the first sensing pattern, the second sensing pattern, and the third sensing pattern.

The fold detector may transmit a sense signal to the at least one sensing pattern and is to receive a folding signal reflected from the sense signal from the at least one sensing pattern when the display substrate is folded. The fold detector may include a sense signal generator to generate a sense signal, and a signal sensor connected to the sense signal generator and the at least one sensing pattern, wherein the signal sensor is to receive the sense signal from the sense signal generator and is to receive the folding signal from the sensing pattern.

The sense signal may include a pulse signal of a predetermined cycle. A magnitude of the folding signal may be less than a magnitude of the sense signal and a phase difference between the folding signal and sense signal may be substantially 180 degrees.

In accordance with one or more other embodiments, a display device includes a first conductor; a second conductor adjacent the first conductor, wherein the first conductor is to be in contact with the second conductor in a first state and wherein the first conductor is to be disconnected from the second conductor in a second state, the first state corresponding to an unfolded state of the display device and the second state corresponding to the display device folded in a first predetermined range of angles.

The first conductor may contact the second conductor at a first node in the first state, and the first node may be spaced a first distance from a folding line of the display device in the first state. The first distance may be substantially zero.

The device may include a third conductor; and a fourth conductor adjacent the third conductor, wherein the third conductor is to be in contact with the fourth conductor in the first state and is to be disconnected from the fourth conductor in a third state, the third state corresponding to the display device folded in a second predetermined range of angles different from the first predetermined range of angles.

The third conductor may contact the fourth conductor at a second node in the first state, the second node may be spaced a second distance from the folding line in the first state, and the second distance may be greater than the first distance. At least two of the first, second, third, and fourth conductors may move relative to the folding line as the display device is folded to within the first and second predetermined ranges, respectively. The fold detector may detect contact between the first and second conductors in the first state and disconnection between the first and second conductors in the second state.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
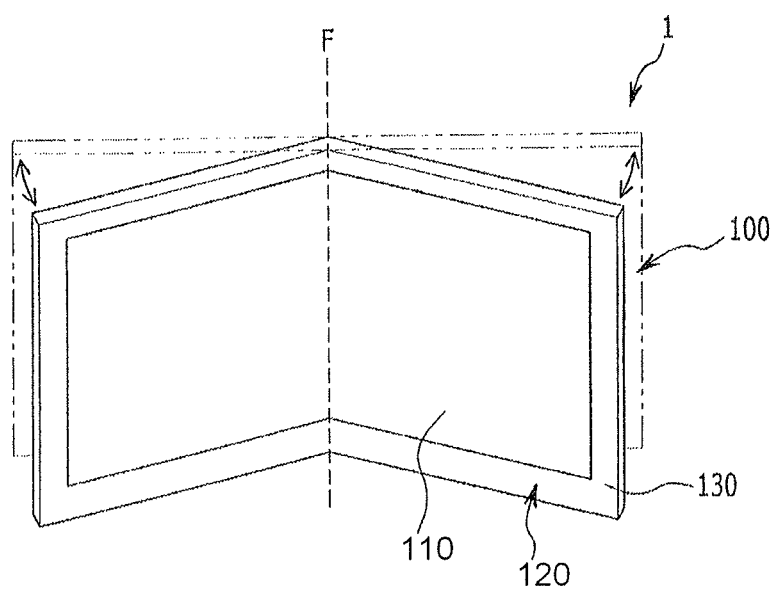
FIG. 1 illustrates an embodiment of a flexible display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
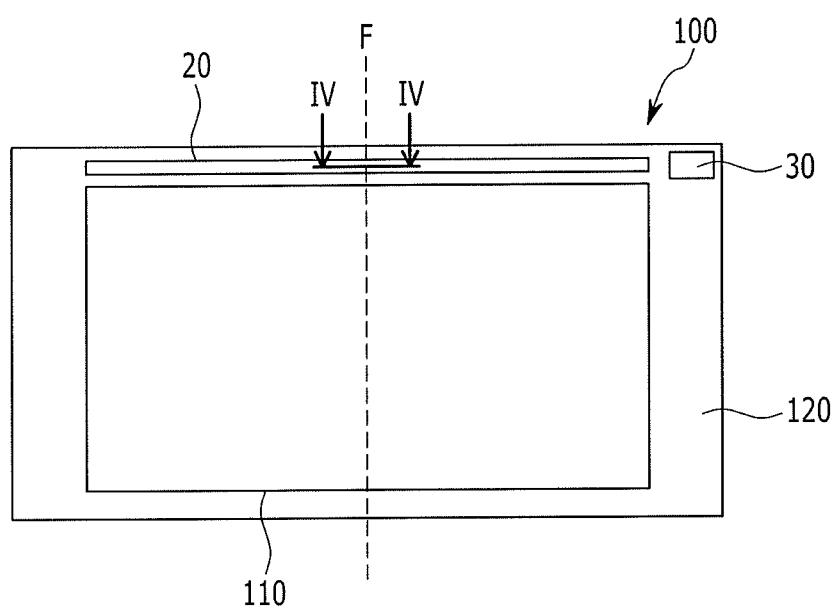
FIG. 2 illustrates a top plan view of the flexible display device.
Figure 3:
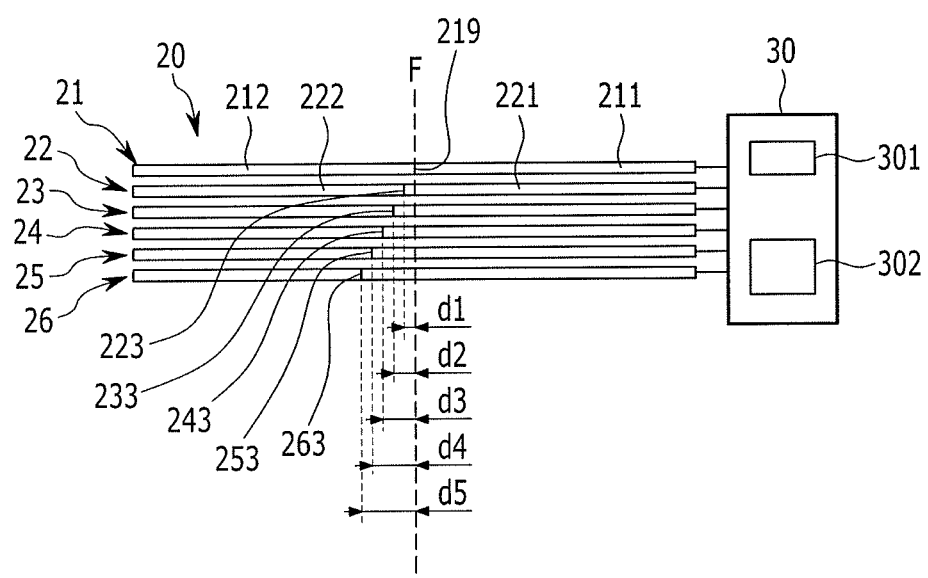
FIG. 3 illustrates an embodiment of a sensing pattern portion and a folding sensing portion of the flexible display device.

FIG. 1 illustrates an embodiment of a flexible display device 1. FIG. 2 illustrates a top plan view of the flexible display device 1. FIG. 3 illustrates an embodiment of a sensing pattern portion and a folding sense portion of the flexible display device 1.

Referring to FIGS. 1 to 3, the flexible display device 1 is formed to be foldable. The display device 1 may be folded at various angles determined by a user, as a result of an external force applied by the user. The display device 1 may be folded along at least one folding line F. FIG. 1 illustrates one folding line F for illustrative purposes only.

The flexible display device 1 may be a liquid crystal display, a field emission display, an organic light emitting diode display device, or an electrophoretic display device, and includes a display substrate 100, a sensing pattern portion 20, and a folding sensing portion 30. The display substrate 100 includes a flexible material, e.g., polyimide, polyethylene terephthalate, polyethylene naphthalate, polycarbonate, and/or polyethersulfone.

The display substrate 100 includes a display area 110 including a plurality of pixels and a peripheral area 120 adjacent the display area 110. In one embodiment, the peripheral area 120 may surround the display area 110.

The sensing pattern portion 20 and the folding sensing portion 30 are in the peripheral area 120 of the display substrate 100, and may sense a folding angle of the display substrate 100 with reference to the folding line F. The folding line F may be disposed at a location that divides the display substrate 100 with reference to an axis (e.g., a long axis) of the display substrate 100.

The sensing pattern portion 20 is at a predetermined location, e.g., an upper peripheral area 120, of the display substrate 100 or may substantially perpendicular to cross the folding line F. The sensing pattern portion 20 includes one or more sensing patterns 21 to 26 that cross the folding line F.

The sensing patterns 21 to 26 may be equally spaced from one another (e.g., at equal distances) or spaced according to another pattern. The sensing patterns 21 to 26 are arranged in an extension direction corresponding, for example, to the folding line F.

The first sensing pattern 21 includes a first connection conductor 211 connected to the folding sensing portion 30, and a first contact conductor 212 selectively contacting the first connection conductor 211. A first node 219 is between the first connection conductor 211 and the first contact conductor 212 where the first connection conductor 211 and the first contact conductor 212 are connected with each other. The first node 219 of the first sensing pattern 21 coincides with the folding line F. The first connection conductor 211 and the first contact conductor 212 include a conductive material, and may be formed on one side of the display substrate 100, for example, by a deposition method.

The second sensing pattern 22, the third sensing pattern 23, the fourth sensing pattern 24, the fifth sensing pattern 25, and the sixth sensing pattern 26 include connection conductors, contact conductors, and nodes 223, 233, 243, 253, and 263 where the connection conductors and the contact conductors selectively contact each other.

The second node 223 to the sixth node 263 of the second sensing pattern 22 to the sixth sensing pattern 26 are separated from the folding line F by a first distance d1 to a fifth distance d5, respectively. The first distance d1 to the fifth distance d5 may gradually increase by the same or different predetermined values. Thus, the distances of the nodes 223 to 263 of the second sensing pattern 22 to the sixth sensing pattern 26 from the folding line F gradually increase from the second node 223 of the second sensing pattern 22.

In the present exemplary embodiment, extension lengths of the sensing patterns 21 to 26 of the sensing pattern portion 20 may be equal to each other. The first connection conductor 211 and the first contact conductor 212 of the first sensing pattern 21 may be symmetrical to each other with reference to the folding line F. In another embodiment, the extension lengths may be different from each other and/or the first connection conductor 211 and the first contact conductor 212 may be asymmetrical relative to the folding line F.

A second connection conductor 221 of the second sensing pattern 22 is longer by the first distance d1 than a second contact conductor 222. Thus, the second node 223 between the second connection conductor 221 and the second contact conductor 222 is separated from the folding line F by the first distance d1. The lengths of the connection conductors are longer by the third distance d3 to the fourth distance d4 than the length of the contact conductor in a direction from the third sensing pattern 23 to the sixth sensing pattern 26.

In the present exemplary embodiment, the nodes 213 to 263 are arranged in a direction away from one end of the connection conductor and connected with the folding sensing portion 30. However, the nodes 213 to 263 may be arranged in a direction close to the end of the connection conductor and connected to the folding sensing portion 30.

The folding sensing portion 30 is connected with the sensing pattern portion 20 and thus transmits a sense signal to the sensing pattern portion 20. When the display substrate 100 is folded, the folding sensing portion 30 receives a folding signal reflected from the sense signal from the sensing pattern portion 20.

The folding sensing portion 30 may be, for example, a time domain reflectometer (TDR) that transmits a signal and senses disconnection of a wire according to a returned signal. The folding sensing portion 30 includes a sense signal generator 301 that generates a sense signal and a signal sensor 302 connected to the sense signal generator 301 and the sensing patterns 21 to 25 of the sensing pattern portion 20.

The signal sensor 302 receives the sense signal from the sense signal generator 302 and receives the folding signal from the sensing pattern portion 20.

In the present exemplary embodiment, the folding sensing portion 30 receives the folding signal, which is a signal reflected from the sense signal, and determines whether the flexible display device 1 is folded. In another embodiment, the folding sensing portion 30 may receive a constant signal from the sensing pattern portion 20. When the sensing pattern portion 20 is disconnected due to folding of the flexible display device 1 and thus the folding sensing portion 30 cannot sense the signal, the folding sensing portion 1 determines that the flexible display device 1 is folded.

In the present exemplary embodiment, the sensing pattern portion 20 includes sensing patterns 21 to 26. In another embodiment, the sensing pattern portion 20 of the flexible display device 1 may include only one sensing pattern.

A process for sensing folding of the flexible display device 1 according to one present exemplary embodiment will now be described.

Figure 4:
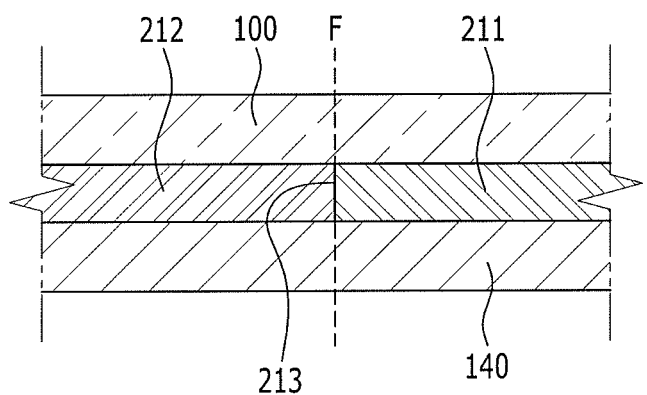
FIG. 4 illustrates a view along section line IV-IV in FIG. 2.
Figure 5:
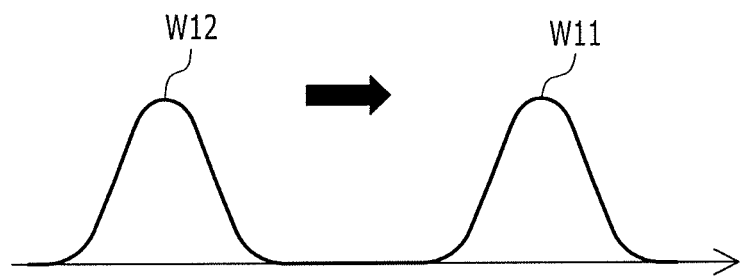
FIG. 5 illustrates an example of a signal sensed by the folding sensing portion when the flexible display device is in a first state.

FIG. 4 illustrates a cross-sectional view taken along line IV-IV in FIG. 2, and FIG. 5 illustrates an example of a signal sensed by the folding sensing portion when the flexible display device of FIG. 1 is in a first state.

Referring to FIGS. 4 and 5, the sensing pattern portion 20 is formed in one side of the display substrate 100 and a passivation layer 140 covering the sensing pattern portion 20 may further be provided. The sensing pattern portion 20 is between one side of the display substrate 100 and the passivation layer 140. The passivation layer 140 may include, for example, polyimide, polyethylene terephthalate, polyethylene naphthalate, polycarbonate, and/or polyethersulfone.

When no stress is applied to the display substrate 100 and thus the display substrate 100 is substantially flat (that is, in a first state), the connection conductors 211 to 261 and the contact conductors 212 to 262 of the sensing pattern portion 20 maintain a contact state and the nodes 213 to 263 are formed between the connection conductors 211 to 261 and the contact conductors 212 to 262.

In this case, the folding sensing portion 30 transmits sense signals to the respective sensing patterns 21 to 26 of the sensing pattern portion 20. A detection signal is formed as a pulse signal having a plurality of pulses W11 and W12, each formed with a predetermined cycle.

When the flexible display device 1 is in the first state (e.g., is substantially flat), the connection conductors 211 to 261 and the contact conductors 212 and 262 of the sensing pattern portion 20 are connected with each other. Thus, the signal sensor 302 of the folding sensing portion 20 senses only the sense signal. When the signal sensor 302 senses only the sense signal, the flexible display device 1 is determined to be in the first state, and no additional control according to a viewing angle is performed to the display area 120.

Figure 6:
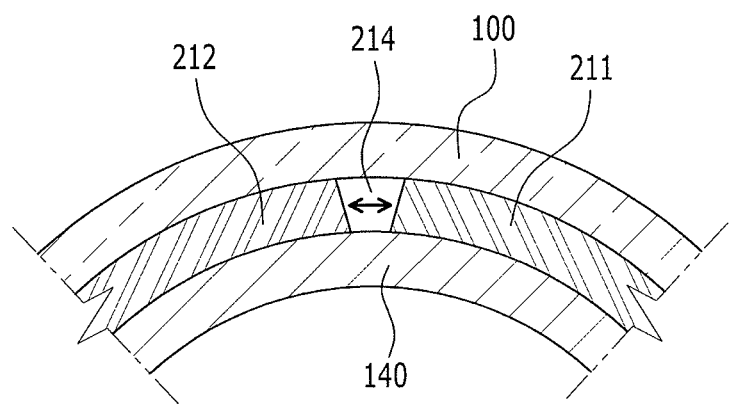
FIG. 6 illustrates the flexible display device in a second state.
Figure 7:
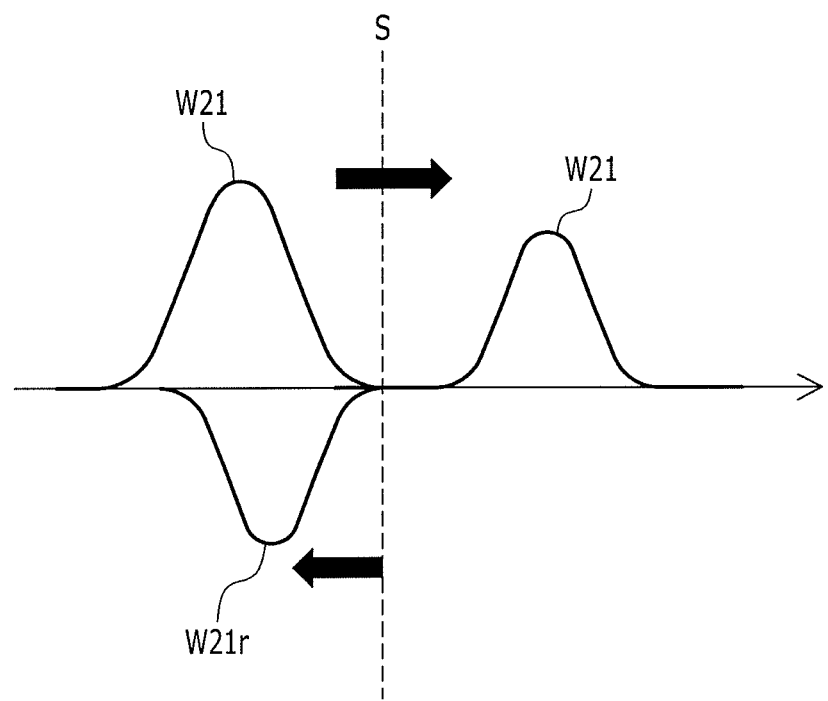
FIG. 7 illustrates an example of a signal sensed by the folding sensing portion when the flexible display device is in the second state.

FIG. 6 illustrates a cross-sectional view of the flexible display device of FIG. 1 in a second state. FIG. 7 illustrates an example of a signal sensed by the folding sensing portion when the flexible display device of FIG. 1 is in the second state.

Referring to FIG. 6 and FIG. 7, when a stress is applied to the flexible display device 1 in the second state and the flexible display device 1 is folded with a predetermined angle with reference to the folding line F, a connection conductor 211 to 261 and a contact conductor 212 to 262 of at least one of the plurality of sensing patterns 21 to 26 of the sense pattern portion 20 are separated from each other. That is, due to the stress applied to the display device 1, contact between connection conductors 211 to 261 and contact conductors 212 to 262 of part or all of the sensing patterns 21 to 26 that cross the folding line F is released and a separated space 214 is formed in a portion corresponding to the nodes 213 to 263. In FIG. 6, an example of the separated space 214 is between the first connection conductor 211 and the first contact conductor 212 of the first sensing pattern 21.

When contact between the connection conductors 211 to 261 and the contact conductors 212 to 262 is released, the signal sensor 302 of the folding sensing portion 30 senses the folding single and determines that the flexible display device 1 is folded. For example, when the sense signal generated from the detection signal generator 301 is transmitted to the first sense pattern 21 and a first sense pulse W21 of the sense signal reaches an incision surface S between the first connection conductor 211 and the first contact conductor 212, part of the first sense pulse W21 is reflected such that a folding pulse W21r of the folding signal is generated. In this example, the folding pulse W21r is smaller than the first sense pulse W21, and has a phase difference of 180 degrees from the first sense pulse W21.

When the detection signal generator 301 detects the folding signal including the first sense pulse W21, the flexible display device 1 is determined to be in a folded state at a predetermined angle, e.g., the second state.

In FIG. 7, the first sense pulse W21 moves while passing through the incision surface S, and the signal sensor 302 senses the pulse as a virtual signal. Also, the first pulse signal W21 does not substantially move to the first contact conductor 212, which is no longer in contact with the first connection conductor 211. In this case, the virtual first sense pulse W21 which passed through the incision surface S may be a pulse signal that is equal to the folding pulse W21r and opposite in phase of first reflection pulse W21.

A process for sensing the folding angle of the flexible display device 1 according to the present exemplary embodiment will now be described.

Figure 8:
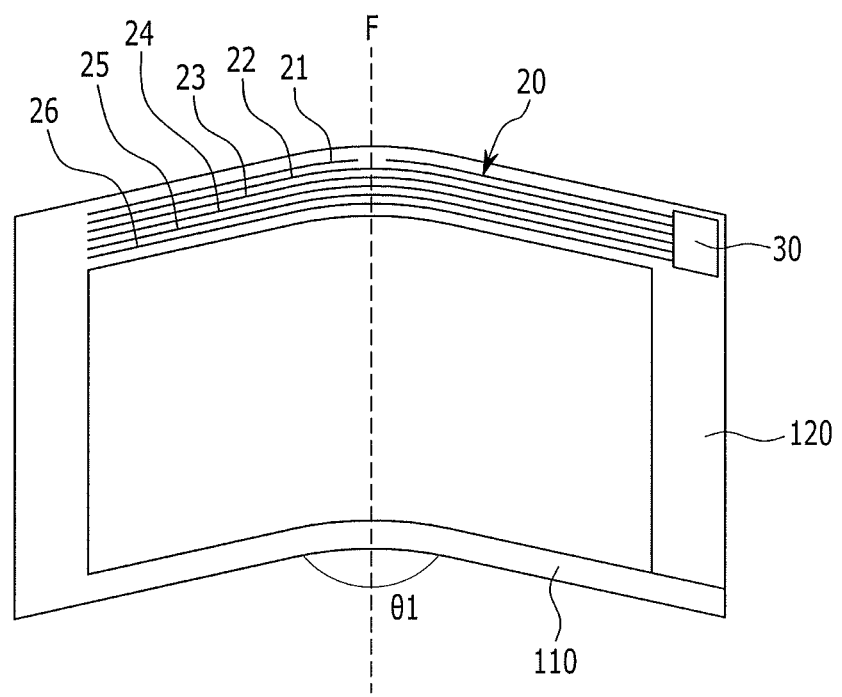
FIG. 8 illustrates the flexible display device folded with a first angle.
Figure 9:
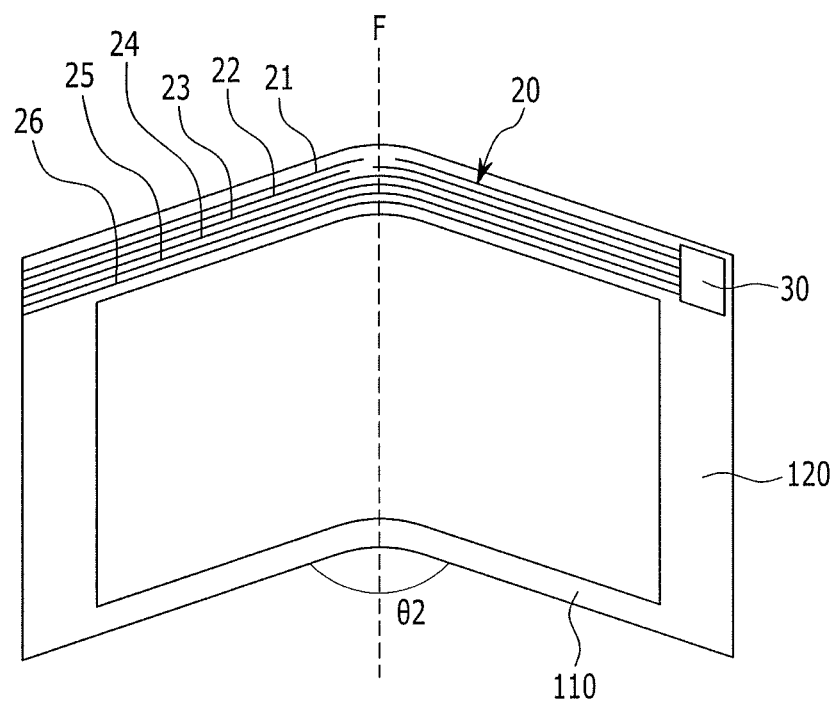
FIG. 9 illustrates the flexible display device folded with a second angle.

FIG. 8 illustrates the flexible display device 1 of FIG. 1 folded at a first angle, and FIG. 9 illustrates the flexible display device 1 folded at a second angle. Referring to FIG. 8, when the display substrate 100 of the flexible display device 1 is folded at a first folding angle θ1 with reference to the folding line F, only the first sensing pattern 21 of the sensing pattern portion 20 is disconnected and the connection conductors and the contact conductors of the second sensing pattern 22 to the sixth sensing pattern 26 respectively maintain connections therebetween. A folding angle θ implies an angle formed by one part and another part of the display substrate 100, divided, for example, with reference to the folding line F.

In this case, the folding sensing portion 30 connected to the sensing pattern portion 20 senses the folding signal only with respect to the first sensing pattern 21. The folding sensing portion 30 does not sense the folding signal with respect to the second to sixth sensing patterns 22 to 26.

When the folding angle θ is 180 degrees in the present exemplary embodiment, the display substrate 100 maintains a substantially flat state. In addition, when the folding angle θ is 0 degrees, the display substrate 100 is considered to be completely folded with reference to the folding line F.

Referring to FIG. 9, when the display substrate 100 of the flexible display device 1 is folded at a second folding angle θ2 with reference to the folding line F, the first sensing pattern 21 and the second sensing pattern 22 of the sensing pattern portion 20 are disconnected. In this example, the second folding angle θ2 is smaller than the first folding angle θ1. The connection conductors and the contact conductors of the third sensing pattern 23 to the sixth sensing pattern 26 respectively maintain connections therebetween.

The node 213 of the first sensing pattern 21 coincides with the folding line F. Thus, when the display substrate 100 is folded at the first folding angle θ1, which is greater than the second folding angle θ2, the first sensing pattern 21 is disconnected.

In addition, the node 223 of the second sensing pattern 22 is separated by the first distance d1 from the folding line F. Therefore, when the display substrate 100 is folded at the second folding angle θ2, which is smaller than the first folding angle θ1, the second sensing pattern 22 is disconnected.

In this case, the folding sensing portion 30 connected to the sensing pattern portion 20 senses the folding signal only with respect to the first and second sensing patterns 21 and 22. The folding sensing portion 30 does not sense the folding signal with respect to the third to sixth sensing patterns 23 to 26.

When the folding sensing portion 30 senses the folding signal only with respect to the first sensing pattern 21, the flexible display device 1 is determined to be folded at the first folding angle θ1. When the folding sensing portion 30 determines the folding signal with respect to the first and second sensing patterns 21 and 22, the flexible display device 1 is determined to be folded at the second folding angle θ2.

When the flexible display device 1 is folded at the first folding angle θ1 and when the flexible display device 1 is folded at the second folding angle θ2, image quality of the flexible display device 1 may be improved by controlling the luminance and contrast ratio, respectively. For example, the nodes of the sensing patterns 21 to 26 are formed in different locations along a direction away from the folding line F. As a result, folding angles that cause disconnection of the sensing patterns 21 to 26 are different from each other. Thus, when the folding signal is sensed in one or more of the sensing patterns 21 to 26, the corresponding folding angle of the display substrate 100 may be detected.

In the present exemplary embodiment, when all of the first sensing pattern 21 to the sixth sensing pattern 26 are disconnected, and thus the folding signal is detected from all of the first to sixth sensing patterns 21 to 26, the display substrate 100 may be determined to be completely folded, e.g., at a folding angle of 0 degrees.

In the present exemplary embodiment, the sensing patterns are at an upper side or at one side of the display substrate 1. In another embodiment, the sensing patterns may be at both in an upper side and bottom side, only at a bottom side of the display substrate 1, at the opposite side of the display substrate 1, or at another location.

According to one exemplary embodiment, when the flexible display device is folded, the folding angle is detected to control luminance or another aspect of the flexible display according to the folding angle. As a result, image quality may be improved. Also, the folding angle may be detected using a simple structure. Therefore, the thickness of the flexible display device may be reduced and manufacturing efficiency may be improved.

Figure 10:
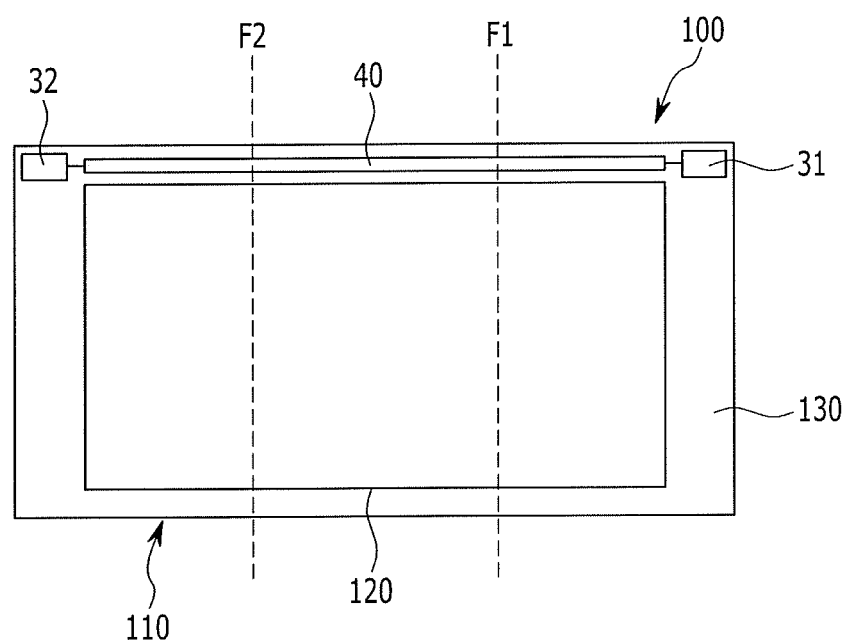
FIG. 10 illustrates another embodiment of a flexible display device.
Figure 11:
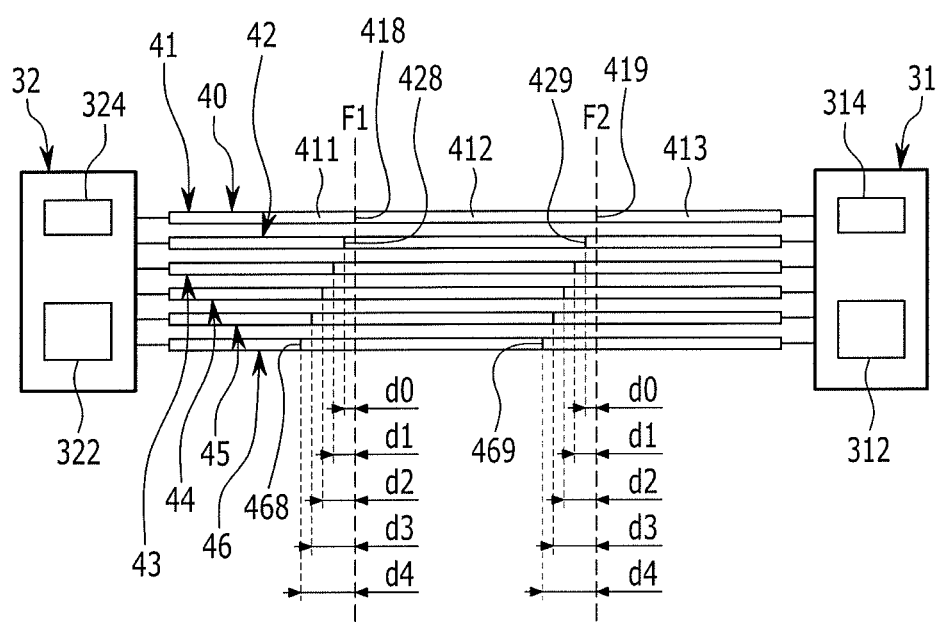
FIG. 11 illustrates an embodiment of a sensing pattern portion and a folding sense portion of the flexible display device in FIG. 10.

FIG. 10 illustrates a top plate view of another embodiment of a flexible display device 100, and FIG. 11 illustrates an embodiment of a sensing pattern portion and a folding sensing portion of the flexible display device 100 in FIG. 10. These embodiments may be the same as the flexible display device 1 of FIGS. 1 to 9, except for configurations of the sensing pattern portion and folding sensing portion.

Referring to FIGS. 10 and 11, the flexible display device 100 includes a first folding line F1 and a second folding line F2. Thus, the flexible display device 100 may be folded into three parts with reference to the first folding line F1 and the second folding line F2. The three parts in this embodiment are of equal size, but may be of different sizes in another embodiment.

The flexible display device 1 includes a first folding sensor 31 and a second folding sensor 32 that are separated from each other with respect to a sensing pattern portion 40 crossing the first folding line F1 and the second folding line F2. The first folding sensor 31 and the second folding sensor 32 respectively include detection signal generators 311 and 321 and signal sensors 312 and 322.

The sensing pattern portion 40 includes a first sensing pattern portion 41 to a sixth sensing pattern portion 46. The first sensing pattern 41 includes a first connection conductor 411 connected to the first folding sensor 31, a second connection conductor 413 connected to the second folding sensor 32, and a contact conductor 412 between the first and second connection conductors 411 and 413 and selectively contacting the first and second connection conductors 411 and 413.

A node 418 between the first connection conductor 411 and the contact conductor 412, and a node 419 between the second connection conductor 413 and the contact conductor 412, are respectively coincide with the first folding line F1 and the second folding line F2.

Like the first sensing pattern 41, the second sensing pattern 42 to sixth sensing pattern 46 also respectively include first connection conductors, second connection conductors, and contact conductors. In this case, nodes between the first connection conductors and the contact conductors and nodes between the second connection conductors and the contact conductors in the second to sixth sensing patterns 42 to 46 are respectively separated from the first folding line F1 and the second folding line F2 by first distances d11 and d21 to sixth distances d61 and d62, respectively. Thus, when the flexible display device 100 is folded with reference to the folding lines, the folding angles with reference to the folding lines may be detected.

Figure 12:
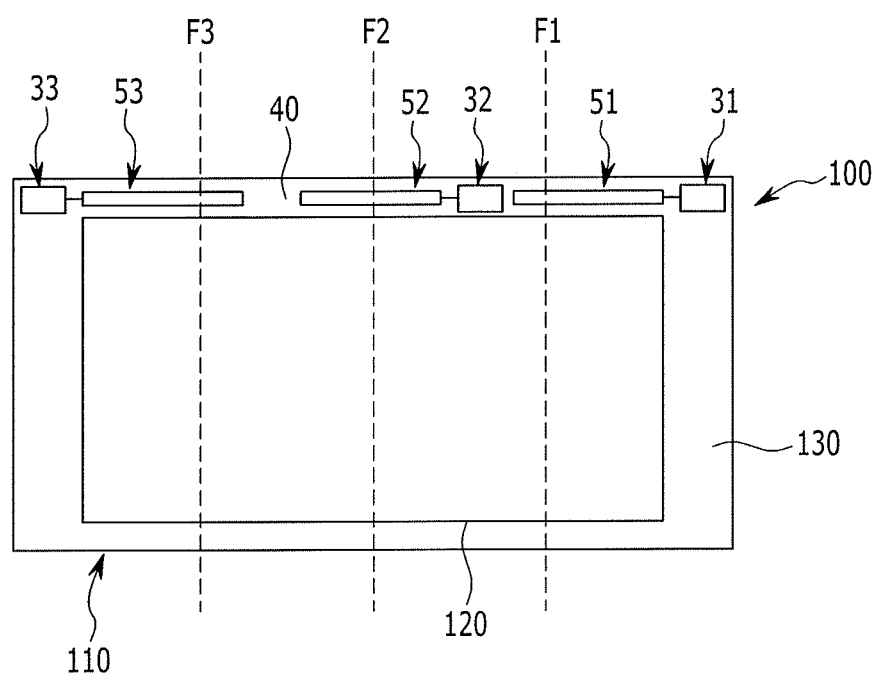
FIG. 12 illustrates another embodiment of a flexible display device.

FIG. 12 illustrates a top plan view of another embodiment of a flexible display device 110. This embodiment is the same as the flexible display device 1 of FIG. 1 to FIG. 9, except for configurations of the sensing pattern portion and folding sensing portion.

Referring to FIG. 12, the flexible display device 110 includes first folding line F1, a second folding line F2, and a third folding line F3. The folding lines F1, F2, and F3 are parallel to each other in this embodiment.

Sensing pattern portions 51, 52, and 53 include a first sensing pattern portion 51, a second sensing portion 52, and a third sensing portion 53 that respectively cross the first folding line F1, the second folding line F2, and the third folding line F3.

Folding sensing portions 31, 32, and 33 includes a first folding sensor 31, a second folding sensor 32, and a third folding sensor 33 that are respectively connected to the first sensing pattern portion 51, the second sensing pattern portion 52, and the third sensing pattern portion 53.

According to this embodiment, even though three or more folding lines F1, F2, and F3 are formed in the flexible display device 110, sensing pattern portions 51, 52, and 53 and folding sensors 31, 32, and 33 are provided as sets corresponding to the folding lines. Thus, the folding angle of the flexible display device 110 may be detected with reference to the folding lines F1, F2, and F3.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A flexible display device, comprising:
   a display substrate which is foldable along at least one folding line;
   at least one sensing pattern in a peripheral area of the display substrate; and
   a fold detector connected to the at least one sensing pattern, the at least one sensing pattern including a node between a connection conductor and a contact conductor, the node offset from the at least one folding line by a distance that corresponds to a folding angle, the fold detector to detect whether the contact and connection conductors of the at least one sensing pattern are disconnected at the node to determine the folding angle.

2. The device as claimed in claim 1, wherein:
   the at least one sensing pattern crosses the at least one folding line,
   the connection conductor is connected to the fold detector,
   the contact conductor is selectively connected to the connection conductor,
   the connection conductor contacts the contact conductor in a first state, and
   the connection conductor is separated from the contact conductor in a second state, the first state corresponds to no stress is applied to the display substrate and the display substrate being substantially flat, and the second state corresponding to stress applied to the display substrate and the display substrate being folded with reference to the at least one folding line.

3. The device as claimed in claim 1, further comprising:
   a plurality of sensing patterns, wherein:
   a node of a connection conductor and a contact conductor of a first sensing pattern coincides with the at least one folding line,
   a node of a connection conductor and a contact conductor of a second sensing pattern is spaced by a first distance from the at least one folding line, and a node of a connection conductor and a contact conductor of a third sensing pattern is spaced by a second distance from the at least one folding line, the first distance different from the second distance.

4. The device as claimed in claim 3, wherein the first distance is less than the second distance.

5. The device as claimed in claim 1, further comprising:
a plurality of sensing patterns, wherein:
a node of a connection conductor and a contact conductor of one of the sensing patterns is separated from the at least one folding line by a first distance, and
a node of a connection conductor and a contact conductor of another one of the sensing patterns is spaced from the at least one folding line by a second distance.

6. The device as claimed in claim 1, wherein:
the fold detector includes a first fold sensor spaced from a second fold sensor with reference to the at least one folding line, and
the at least one sensing pattern includes:
a first connection conductor connected to the first folding sensor,
a second connection conductor connected to the second folding sensor, and
a contact conductor between the first connection conductor and the second connection conductor and selectively contacting the first connection conductor and the second connection conductor.

7. The device as claimed in claim 6, further comprising:
a plurality of folding lines including a first folding line adjacent to the first folding sensor and a second folding line adjacent to the second folding sensor, wherein:
the first connection conductor, the second connection conductor, and the contact conductor to contact each other in a first state,
the first connection conductor is spaced from the contact conductor in a second state; and
the second connection conductor is spaced from the contact conductor a third state, wherein no stress is applied to the display substrate and the display substrate is substantially flat in the first state, stress is applied to the display substrate and the display substrate is folded with reference to the first folding line in the second state, and stress is applied to the display substrate and the display substrate is folded with reference to the second folding line in the third state.

8. The device as claimed in claim 1, further comprising:
a plurality of folding lines including a first folding line, a second folding line, and a third folding line that are substantially parallel with each other,
a plurality of sensing patterns including a first sensing pattern, a second sensing pattern, and a third sensing pattern respectively crossing the first folding line, the second folding line, and the third folding line, and
the fold detector includes a first folding sensor, a second folding sensor, and a third folding sensor respectively connected to the first sensing pattern, the second sensing pattern, and the third sensing pattern.

9. The device as claimed in claim 1, wherein the fold detector is to transmit a sense signal to the at least one sensing pattern and is to receive a folding signal reflected from the sense signal from the at least one sensing pattern when the display substrate is folded.

10. The device as claimed in claim 9, wherein the fold detector includes:
a sense signal generator to generate a sense signal, and
a signal sensor connected to the sense signal generator and the at least one sensing pattern, wherein the signal sensor is to receive the sense signal from the sense signal generator and is to receive the folding signal from the sensing pattern.

11. The device as claimed in claim 9, wherein the sense signal includes a pulse signal having a predetermined cycle.

12. The device as claimed in claim 9, wherein:
a magnitude of the folding signal is less than an magnitude of the sense signal, and
a phase difference between the folding signal and the sense signal is substantially 180 degrees.

13. A display device, comprising:
a first conductor; and
a second conductor adjacent the first conductor at a first node offset a distance from a folding line, wherein the first conductor is to be in contact with the second conductor in a first state and wherein the first conductor is to be disconnected from the second conductor at the first node in a second state, the first state corresponding to an unfolded state of the display device and the second state corresponding to the display device folded in a first predetermined range of angles which corresponds to the first node.

14. The device as claimed in claim 13, wherein:
the first conductor contacts the second conductor at the first node in the first state, and the first node is spaced a first distance from a folding line of the display device in the first state.

15. The device as claimed in claim 14, further comprising:
a third conductor; and
a fourth conductor adjacent the third conductor at a second node offset from the first node, wherein the third conductor is to be in contact with the fourth conductor at the second node in the first state and is to be disconnected from the fourth conductor in a third state, the third state corresponding to the display device folded in a second predetermined range of angles different from the first predetermined range of angles.

16. The device as claimed in claim 15, wherein the first distance is substantially zero.

17. The device as claimed in claim 15, wherein:
the third conductor is to contact the fourth conductor at the second node in the first state,
the second node is spaced a second distance from the folding line in the first state, and
the second distance greater than the first distance.

18. The device as claimed in claim 17, wherein at least two of the first, second, third, or fourth conductors move relative to the folding line as the display device is folded to within the first and second predetermined ranges, respectively.

19. The device as claimed in claim 13, further comprising:
a fold detector to detect contact between the first and second conductors at the first node in the first state and disconnection between the first and second conductors at the first node in the second state.

* * * * *